United States Patent
Upadrasta et al.

(10) Patent No.: US 9,921,871 B2
(45) Date of Patent: Mar. 20, 2018

(54) EVENT PROCESSING SYSTEMS AND METHODS

(71) Applicant: MuSigma Business Solutions Pvt. Ltd., Bangalore (IN)

(72) Inventors: Bharat Upadrasta, Bangalore (IN); Srinivasan Sudarsanam, Bangalore (IN); Zubin Dowlaty, Georgetown, TN (US); Subir Mansukhani, Hyderabad (IN)

(73) Assignee: MU SIGMA BUSINESS SOLUTIONS PVT. LTD., Bengaluru (IN)

( * ) Notice: Subject to any disclaimer, the term of this patent is extended or adjusted under 35 U.S.C. 154(b) by 30 days.

(21) Appl. No.: 14/578,254

(22) Filed: Dec. 19, 2014

(65) Prior Publication Data

US 2016/0026495 A1 Jan. 28, 2016

(30) Foreign Application Priority Data

Jul. 25, 2014 (IN) .......................... 3649/CHE/2014

(51) Int. Cl.
G06F 9/46 (2006.01)
G06F 9/48 (2006.01)
G06F 9/455 (2006.01)

(52) U.S. Cl.
CPC ............ *G06F 9/466* (2013.01); *G06F 9/4843* (2013.01)

(58) Field of Classification Search
None
See application file for complete search history.

(56) References Cited

U.S. PATENT DOCUMENTS

| 6,314,555 | B1* | 11/2001 | Ndumu | G06F 8/10 706/49 |
| 6,681,243 | B1* | 1/2004 | Putzolu | H04L 29/06 709/202 |
| 2005/0114500 | A1* | 5/2005 | Monk | H04L 12/2602 709/224 |
| 2006/0075408 | A1* | 4/2006 | Powers | G06F 9/5072 718/100 |
| 2013/0204922 | A1* | 8/2013 | El-Bakry | G06Q 10/06 709/202 |

(Continued)

*Primary Examiner* — Wynuel Aquino
(74) *Attorney, Agent, or Firm* — Harness, Dickey & Pierce, P.L.C.

(57) ABSTRACT

An event processing system includes a multi-agent based system, which includes a core engine configured to define and deploy a plurality of agents configured to perform a first set of programmable tasks defined by one or more users. The first set of tasks operates with real time data. The multi-agent based system also includes a monitoring engine configured to monitor a lifecycle of the agents, communication amongst the agents and processing time of the tasks. The multi-agent based system further includes a computing engine coupled to the core engine and configured to execute the first set of tasks. The event processing system includes a batch processing system configured to enable deployment of a second set of programmable tasks that operates with non-real time data and a studio coupled to the multi-agent based system and configured to enable users to manage the multi-agent based system and the batch processing system.

14 Claims, 9 Drawing Sheets

(56) References Cited

U.S. PATENT DOCUMENTS

| | | | |
|---|---|---|---|
| 2015/0154039 A1* | 6/2015 | Zada | G06F 9/5011 718/1 |
| 2015/0244775 A1* | 8/2015 | Vibhor | G06Q 10/06 709/203 |

* cited by examiner

Details for All EcoSystems — 132

| | Agencies | Agents | Host | Inbox Msgs | Computing Time(ms) | Total Msgs Rcvd | Total Msgs Sent | Msgs Rcvd From | TimeStamp |
|---|---|---|---|---|---|---|---|---|---|
| 1 | MINT_LogReturns | correlationAgentLog... | icosa4 | 0 | 10450.53 | 0 | 68475 | | 01/30/2014... |
| 2 | MINT_News | yahooNewsAgent | icosa3 | 0 | 2969.84 | 0 | 40504 | consume... | 01/30/2014... |
| 3 | MINT_RawPrices | correlationAgentRa... | icosa3 | 0 | 0.00 | 6740 | 33700 | correlatio... | 01/30/2014... |
| 4 | MINT_LogReturns | mstAgentLR | icosa4 | 0 | 78.98 | 13695 | 27390 | | 01/30/2014... |
| 5 | MINT_Gameboard | GmBrdConsumer | icosa3 | 0 | 0.00 | 0 | 20238 | | 01/30/2014... |
| 5 | MINT_News | nasdaqNewsAgent | icosa3 | 0 | 9206.82 | 0 | 15457 | | 01/30/2014... |
| 6 | MINT_LogReturns | sammons2DAgentLR | icosa4 | 0 | 47.36 | 13695 | 13695 | correlatio... | 01/30/2014... |
| 7 | MINT_LogReturns | rForceDirectedAgent. | icosa4 | 0 | 59.01 | 13695 | 13695 | correlatio... | 01/30/2014... |
| 8 | MINT_LogReturns | sammons3DAgentLR | icosa4 | 0 | 51.23 | 13695 | 13695 | correlatio... | 01/30/2014... |
| 9 | MINT_LogReturns | commCentralityAgen. | icosa3 | 0 | 49.37 | 13695 | 13492 | mstAgent, | 01/30/2014... |
| 10 | MINT_Gameboard | GmBrdVQAgent | icosa3 | 0 | 0.00 | 6746 | 13480 | GmBrdCo... | 01/30/2014... |
| 11 | | mstAgent | icosa3 | 0 | 11390.06 | 0 | 10111 | correlatio... | 01/30/2014... |
| 12 | MINT_News | googleNewsAgent | icosa3 | 0 | 0.00 | 0 | 6746 | GmBrdC... | 01/30/2014... |
| 13 | MINT_Gameboard | GmBrdMst | icosa3 | 0 | 0.00 | 6746 | 6746 | GmBrdC... | 01/30/2014... |
| 14 | MINT_Gameboard | GmBrdCorrelations | icosa3 | 0 | 0.00 | 6746 | 6744 | GmBrdQ... | 01/30/2014... |
| 15 | MINT_Gameboard | GmBrdStatePredictio. | icosa3 | 0 | 0.00 | 6746 | 6740 | | 01/30/2014... |
| 16 | MINT_RawPrices | consumerAgent | icosa3 | 0 | 0.00 | 0 | 6740 | mstAgent, | 01/30/2014... |
| 17 | MINT_RawPrices | commCentralityAgent | icosa3 | 0 | 0.00 | 6746 | 6740 | correlatio... | 01/30/2014... |
| 18 | MINT_RawPrices | rForceDirectedAgent | icosa3 | 0 | 0.00 | 6746 | 6739 | correlatio... | 01/30/2014... |
| 19 | MINT_RawPrices | sammons2Agent | | | | | | | |

Ecosystems
- All
- MUSTANG
- MINT
- Test
- Groovy

Agencies
- All
- Property Test
- MINT_RealTime
- MINT_GB_Events
- ScalabilityTestAgent
- ScalabilityTestAgent

Agents
- commCentralityAgent
- VarCumsumMetaTr...
- ScalabilityTestAgent1
- ScalabilityTestAgent2
- ScalabilityTestAgent3

Systems
- Active MQ

FIG. 8

EVENT PROCESSING SYSTEMS AND METHODS

BACKGROUND

The invention relates generally to frameworks, and more particularly to an event processing system for processing real time data and non-real time data while executing programmable tasks.

In today's information-rich environment, the efficient handling of massive volumes of data is important and challenging. Typically, this data may be provided in streams, with, in many instances, data values being generated in real-time, as events occur. For example, microsensors used in radio-frequency identification (RFID) in tracking and access applications can provide streaming data on locations of objects being tracked. As another example, data defining financial transactions may be provided in a stream as those transactions occur.

For many businesses the ability to operate on streaming data arriving in real-time can provide significant competitive advantage. For example, financial operations that are based on results of financial transactions may receive streams of data on trades as they occur. Moreover, responding to particular signals in the streaming data quickly is often a critical aspect of many applications. As an example, network monitoring systems used by government agencies to detect security threats need to detect and report events represented in streams of data collected through monitoring.

However, in most applications, processing of streamed data is performed by first storing the data in a database. The database could then be queried to retrieve the data for further processing and analysis. Therefore, analyzing the data in real-time is difficult, because of the limits imposed by database access time, particularly for streams with high data rates.

Therefore, there is a need for an integrated system that enables the use of real time and non-real time data in event processing systems while executing several software applications.

SUMMARY

Briefly, according to one aspect of the invention, an event processing system is provided. The event processing system includes a multi-agent based system. The multi-agent based system includes a core engine configured to define and deploy a plurality of agents configured to perform a first set of programmable tasks defined by one or more users. The first set of programmable tasks is configured to operate with real time data. The multi-agent based system also includes a monitoring engine configured to monitor a lifecycle of the plurality of agents, communication amongst the plurality of agents and a processing time of the programmable tasks. The multi-agent based system further includes a computing engine coupled to the core engine and configured to execute the first set of programmable tasks. The event processing system includes a batch processing system configured to enable deployment of a second set of programmable tasks that operate with non-real time data and a studio coupled to the multi-agent based system and configured to enable the one or more users to manage the multi-agent based system and the batch processing system.

In accordance with another aspect, a real time multi-agent based system for executing programmable tasks is provided. The system includes a core engine configured to define and deploy a plurality of agents configured to perform a set of programmable tasks defined by one or more users. The set of programmable tasks is configured to operate with real time data. The real time multi-agent based system also includes a monitoring engine configured to monitor a lifecycle of the plurality of agents, communication amongst the plurality of agents and processing time of the programmable tasks. The real time multi-agent based system further includes a computing engine coupled to the core engine and configured to execute the set of programmable tasks and a studio coupled to the multi-agent based system and configured to enable the one or more users to manage the multi-agent based system.

In accordance with yet another aspect, a method for processing an event is provided. The method includes defining and deploying a plurality of agents configured to perform a first set of programmable tasks defined by one or more user. The first set of programmable tasks is configured to operate with real time data. The method also includes monitoring a lifecycle of the plurality of agents, communication amongst the plurality of agents and a processing time of the programmable tasks. The method further includes executing the first set of programmable tasks and deploying a second set of programmable tasks that operates with non-real time data. In addition, the method includes enabling the one of more users to manage the real time data and the non-real time data.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 8 is graphical representation of an example user interface depicting ecosystems, agencies and agents of an event processing system implemented according to aspects of the present technique.

DETAILED DESCRIPTION

The present invention provides an event processing system and method configured to process real time data and non-real time data while executing programmable tasks. The event processing systems and methods are described with example embodiments and drawings. References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
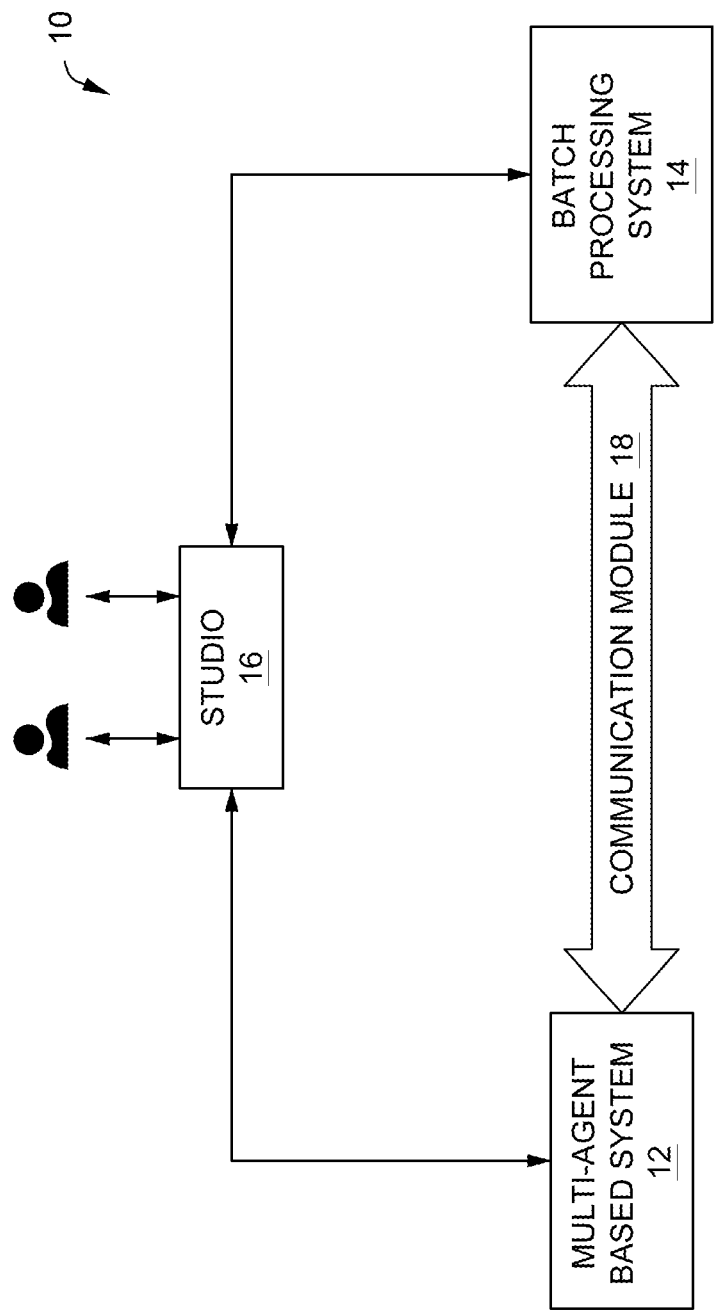
FIG. 1 is a block diagram of one embodiment of an event processing system implemented according to aspects of the present technique.

FIG. 1 is a block diagram of an event processing system adapted to process real time data and non-real time data in accordance with the present technique. The event processing system 10 is a distributed framework with loosely coupled components. The event processing system 10 includes a multi-agent based system 12, a batch processing system 14, a studio 16, and a communication module 18. Each component is described in further details below.

Multi-agent based system 12 is configured to receive a first set of programmable tasks defined by one or more users. As used herein, the term "user" may refer to both natural people and other entities that operate as a "user". Examples include corporations, organizations, enterprises, teams, or other group of people. In this embodiment, the first set of programmable tasks is configured to operate with real time data. Examples of the first set of programmable tasks include algorithmic trading, fraud detection, demand sensing, payments and cash monitoring, dynamic pricing and yield management, data security monitoring, supply chain optimization and the like.

Multi-agent based system 12 comprises agents configured to represent an application defined by one or more users. For the purpose of this description, an agent refers to a software program designed to carry out one or more programmable tasks. The agent is further configured to communicate with other agents in the event processing system 10.

Multi-agent based system 12 performs various operations like creating and deploying the agents to perform the first set of programmable tasks, monitoring a lifecycle of the agents and executing the first set of programmable tasks. In one embodiment, the agent is an entity configured to perform one or more analytical tasks defined by users. The agent is created by uploading the analytical script file into the event processing system 10. Further, the agents present in the multi-agent based system 12 can be moved across separate devices of the event processing system 10. The mobility of agents across several devices is explained in detail in FIG. 4. The agents communicate with each other in the multi-agent based system 12 using an agent communication language. In one embodiment, the agents are implemented using java agent development framework (JADE). In addition, the multi-agent based system 12 includes a library of pre-defined agents.

Batch processing system 14 is configured to enable deployment of a second set of programmable tasks defined by users. In this embodiment, the second set of programmable tasks is configured to operate with non-real time data. Examples of the second set of programmable tasks include identifying causes of revenue leakage, customer buying pattern, impact of price rise on sales, identifying sales drivers and the like. The programmable tasks defined by the users include scripts like R scripts, Python scripts and the like.

Studio 16 is coupled to the multi-agent based system 12 and is configured to enable the users to interact with the multi-agent based system 12 and the batch processing system 14. The studio 16 performs various operations like enabling the users to define the agents, triggering, deploying the first set and the second set of programmable tasks, etc.

Studio 16 includes a user interface (not shown) configured to enable the users to define the agents and to trigger and deploy a set of programmable tasks. The studio 16 enables the users to select and group a set of agents to form an agency. In one embodiment, the set of agents are selected based on a set of parameters determined by the users. The agents are grouped together based on their input and output type compatibility. For example, a first agent may generate an output as a string and is grouped with a second agent that accepts a string input. Studio 16 is further configured to enable the users to select and group a set of related agencies to form an ecosystem. In one embodiment, the set of agencies are selected based on a set of criteria determined by the users. Further, new agencies that are created can be tagged to an existing ecosystem.

In one embodiment, studio 16 is built using advanced visualization tools and techniques that makes it configurable across different devices including mobile devices, tablets, personal computers and the like. In addition, studio 16 acts as a personal workspace of an individual user and allows designing workflows either in a bottom-up manner (create agents, group them together as agency and tag the agency to the ecosystem) or top-down manner (create ecosystem, then create and tag agency to it and then create agents within the agency and group them together).

Studio 16 further enables the users to perform various operations like create, edit, pause, delete, kill agents, agencies and ecosystems. Studio 16 allows the user to view the agent's properties, the script file powering its functionality, edit data information like name, alias etc., pause the agent during its activity, kill the agent and delete its data.

Communication module 18 is configured to facilitate communication between the multi-agent based system 12 and the batch processing system 14. Examples of the communication module include enterprise service bus (ESB), web OTX ESB, service oriented architecture (SOA) ESB and the like. The functionality of the communication module 18 is characterized by its ability to integrate various underlying components of operation in a manner that facilitates interaction and cooperation within the system. The manner in which the multi-agent based system 12 operates is described in further details below.

Figure 2:
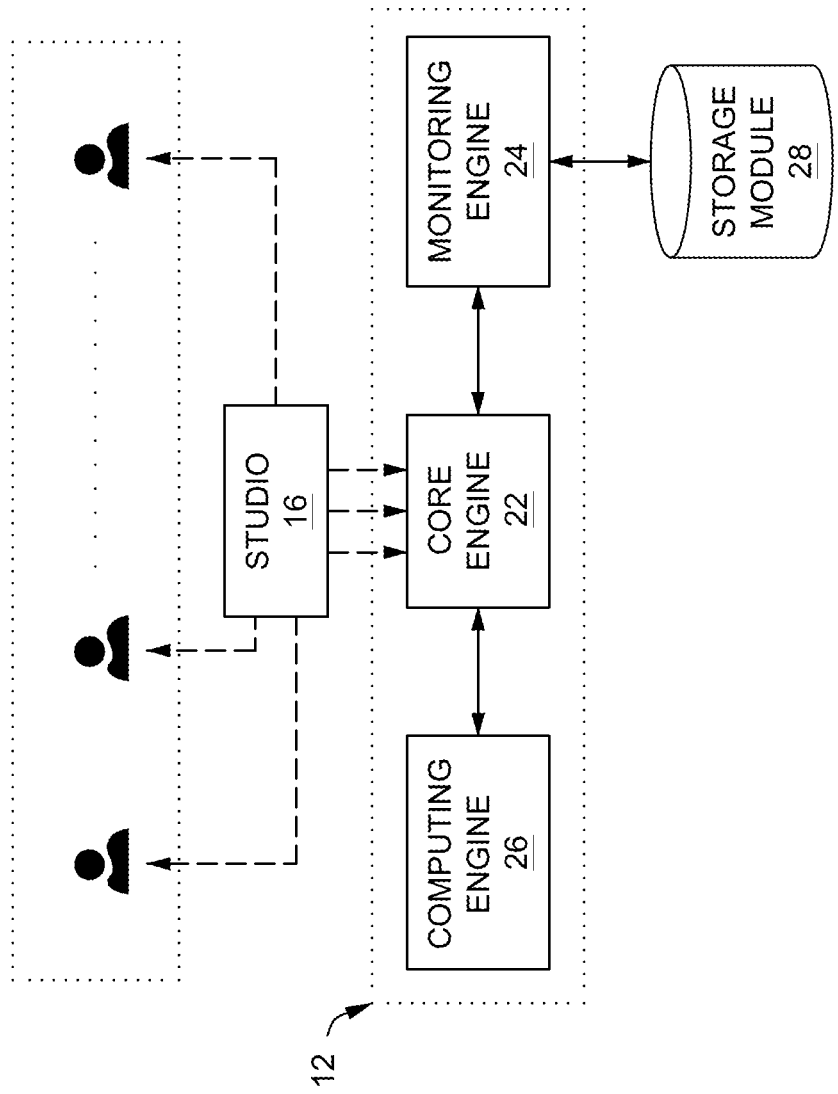
FIG. 2 is a block diagram of one embodiment of a multi-agent based system implemented according to aspects of the present technique.

FIG. 2 is a block diagram of an embodiment of a multi-agent based system implemented according to aspects of the present technique. Multi-agent based system is configured to perform a first set of programmable tasks. The multi-agent based system 12 includes a core engine 22, a monitoring engine 24 and a computing engine 26. Each component is described in further detail below.

Core engine 22 is configured to create and deploy agents to perform a set of programmable tasks defined by one or more users. In one embodiment, the core engine 22 is an agent factory that creates the agents. The agents may also be selected from a pre-defined library of agents. Further, the core engine 22 is configured to define a functioning of an agent according to a pre-defined agent behavior. It may be noted that, an agent resides in the core engine 22 throughout its life cycle. In one specific embodiment, the core engine 22 is a sub platform of JADE responsible to validate, build and publish the agency on receipt of a JavaScript Object Notation (JSON) representation of the agency. JSON is an open standard format that uses human-readable text to transmit data objects consisting of attribute-value pairs. It is used primarily to transmit data between a server and a web application.

Monitoring engine 24 is coupled to core engine 22 and is configured to monitor a lifecycle of the agents. The monitoring of agents include a current state (one of active, suspend and kill), agents in the system it communicates with (including number of messages and content of those messages) and the processing time of its tasks. In one embodiment, the monitoring engine 24 is developed using JADE. JADE is a software development framework providing an environment through a middle ware that complies with foundation for intelligent physical agents (FIPA) specifications and services. JADE provides services that facilitate the interoperability of the multi-agent based system 12 through a host of resident entities as described below in FIG. 5.

The computing engine 26 is coupled to the core engine 22 and is configured to execute the first set of programmable tasks. In one embodiment, the computing engine 26 includes an R computing cluster of R machines that are used to run the first set of programmable tasks. In one embodiment, the R computing cluster is a group of R machines dedicated solely for the processing of R-JADE agents. R-JADE agents are a subset of all agents residing in the core engine 22.

A storage module 28 is coupled to the monitoring engine 24 and is configured to store real time data and non-real time data associated with the first set of programmable tasks and the second set of programmable tasks respectively. In this embodiment, the storage module 28 is used to store meta-data information at the ecosystem, agency, agent and user levels. The manner in which the core engine 22 operates is described in further detail below.

Figure 3:
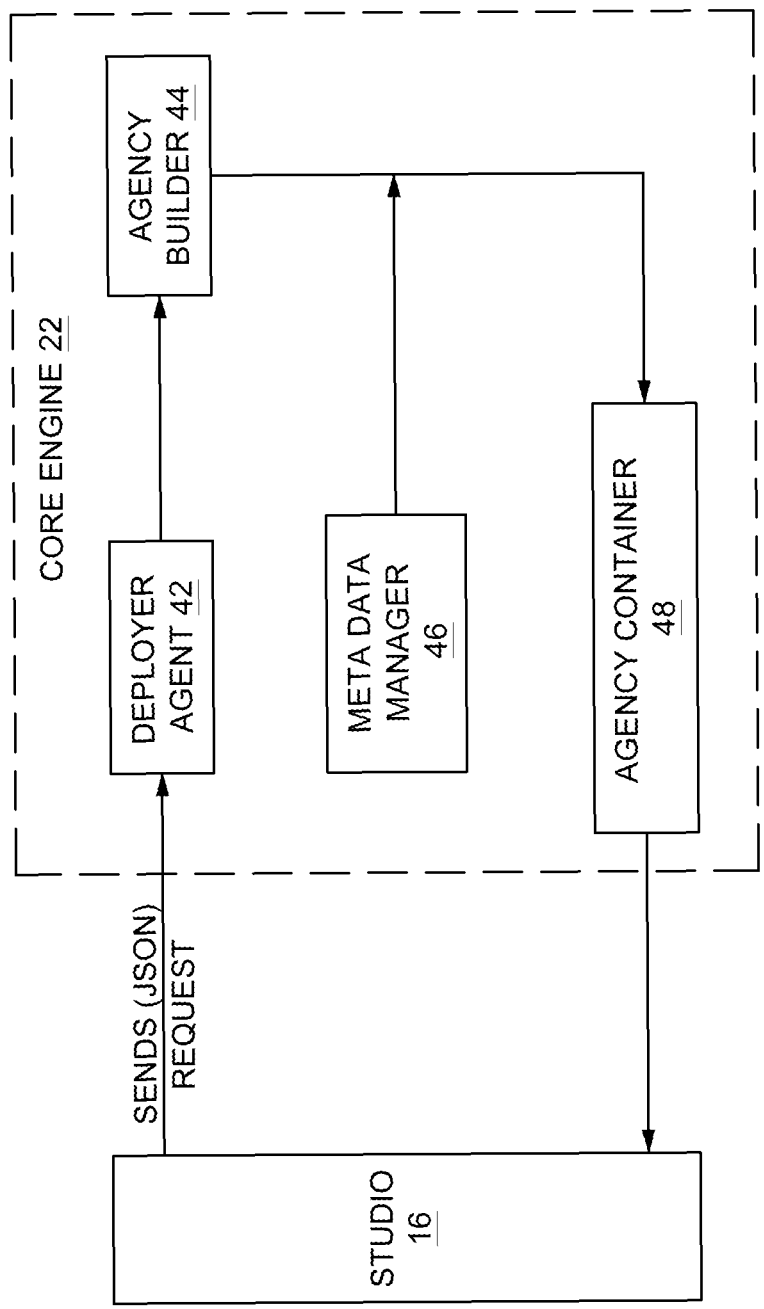
FIG. 3 is a block diagram of one embodiment of a core engine implemented according to aspects of the present technique.

FIG. 3 is a block diagram of one embodiment of a core engine implemented according to aspects of the present technique. The core engine 22 includes a deployer agent 42, an agency builder 44, a meta-data manager 46 and an agency container 48. Each component is described in further detail below.

A deployer agent 42 is coupled to the studio 16 and is configured to receive request (JSON) via the studio 16 for the creation of one or more agents. In one embodiment, the deployer agent 42 present in the core engine 22 is a listener implementation of a socket I/O server and employs a dedicated port to function. Socket I/O server is a java script library for real time web applications. In addition, the deployer agent 42 parses the input request into an appropriate set of instructions compatible with agency builder 44 to create one or more agents based on the received request.

Agency builder 44 is configured to create an agent template that binds one or more parameters defining a behavior of the agents. The agency builder 44 validates the set of instructions received from the deployer agent 42 and builds an agency. As used herein, an agency comprises one or more agents. In one embodiment, the agency builder 44 is configured to create one or more agents.

The meta-data manager 46 is coupled to the agency builder 44 and is configured to perform several operations to convert the agency bean to an agency container 48. The several operations performed by meta-data manager 46 include adding behavior to the agents, plumbing scalability feature to the agents, preparing agents for monitoring, adding a logger agent to the agency, inducing mobility to the computing process and agent, and wrapping agents in the agency container 48.

Agency container 48 is coupled to the agency builder 44 and includes all the agencies that were created. Agency container 48 is further configured to update an agency status. In one embodiment, the agency container 48 is a collection of all the agents that are grouped together based on a set of parameters. In one embodiment, the set of parameters are determined by the users and are implemented as a running instance of the JADE runtime environment. The monitoring and functioning of the agents is described in further detail below.

Figure 4:
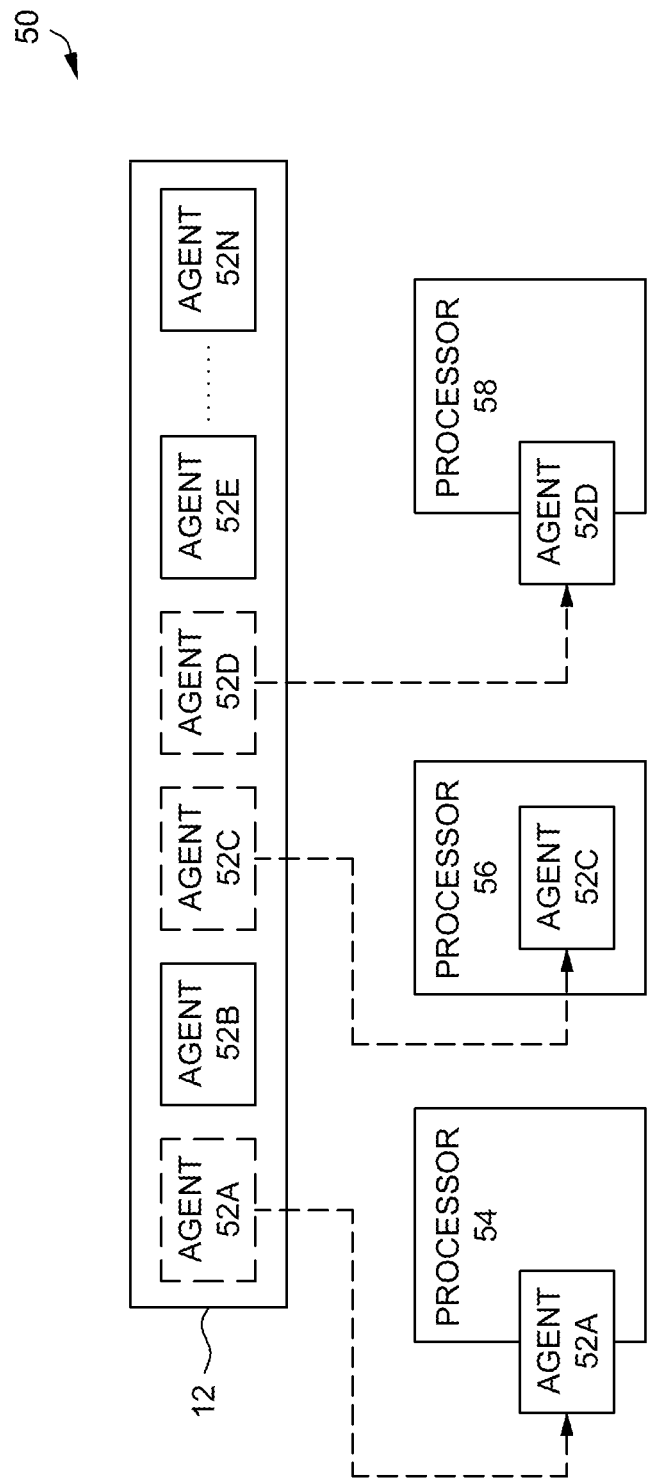
FIG. 4 represents an example scenario depicting mobility of agents across several processors implemented according to aspects of the present technique.

FIG. 4 represents an example scenario depicting mobility of agents across several processors implemented according to aspects of the present technique. As described earlier, the multi-agent based system comprises one or more agents. The operations related to mobility of agents are described in further detail below.

The agents and/or agencies present in the multi-agent based system 12 are configured to be moved across separate instances of the event processing system 10. In one embodiment, each instance is executed on a separate processor. As illustrated in the scenario represented in FIG. 4, the agent 52-A is pushed to the processor 54 executing a first instance. Similarly, the agent 52-D is pushed to the processor 58 executing a second instance. Further, it can be seen, that the agent 52-C is pushed to the processor 56 executing a third instance.

In one embodiment, the mobility of agents and/or agencies is performed using several network protocols that allow agents to move not only to another running instance of the event processing system, but also to various hardware devices such as mobile phones, mini computers and any device that can be interfaced over a network. This provides agents and/or agencies the ability to be embedded in various processors to either extract or even process the data and directly provide insights. Thus, the mobility of agents and/or agencies offers a flexible data processing solution. Further, all agents are monitored as described in further detail below.

Figure 5:
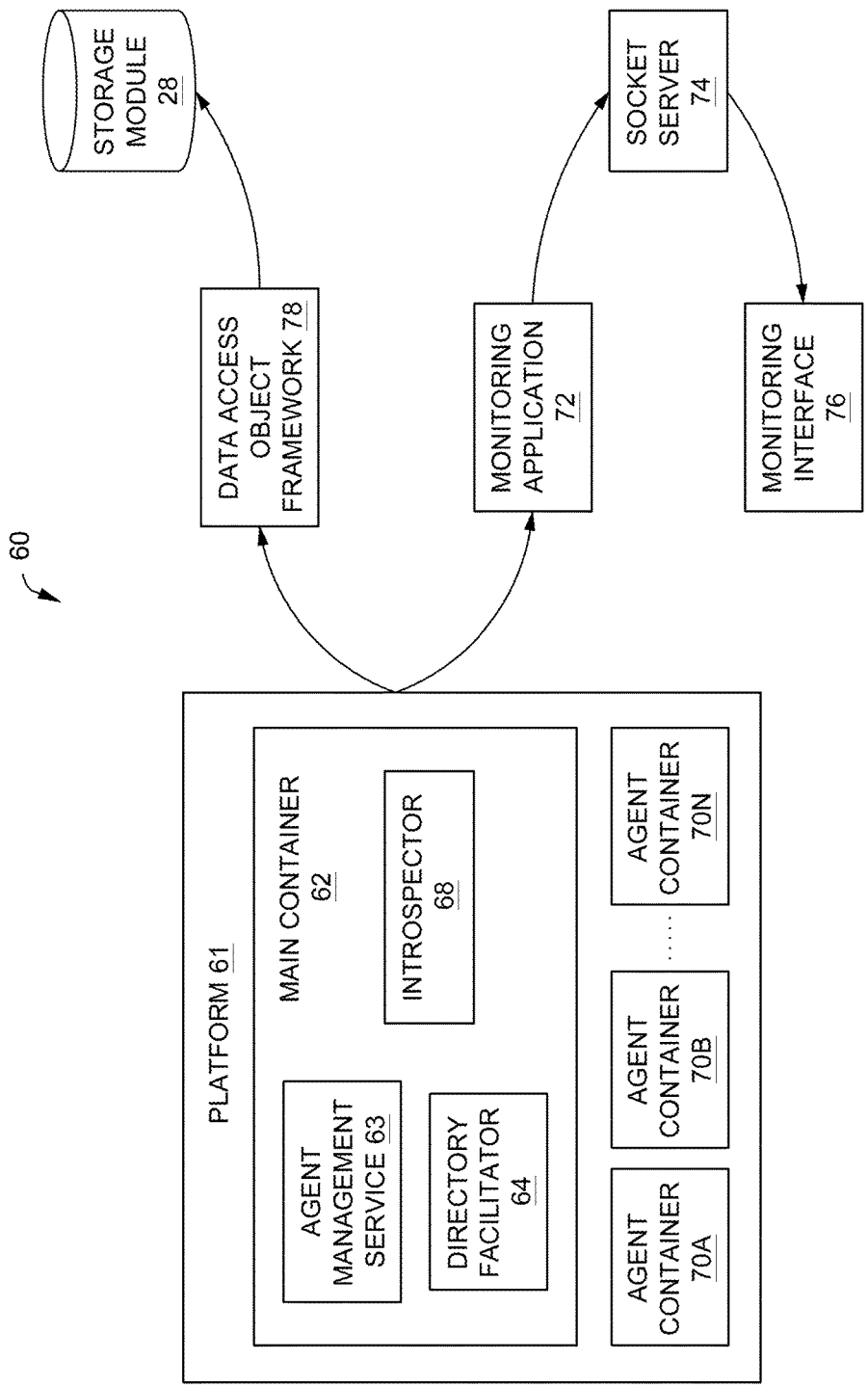
FIG. 5 is a block diagram of an example platform and related operations for monitoring of an event processing system implemented according to aspects of the present technique.

FIG. 5 is a block diagram of an example platform and related operations for monitoring of an event processing system implemented according to aspects of the present technique. The operations are described in further detail below.

As described above, the agency container 48 is a collection of all the agencies. Platform 61 represents all active agent containers. In the illustrated figure platform 61 comprises a main container 62 and agent container 70-A through 70-N. In the illustrated embodiment, the main container 62 represents the active container that is in active state at all instances. Agent container 70-A through 70-N are registered to the main container 62 upon initiation. Since the main container 62 is the active container, it is the first container to start on platform 61. The other agent containers 70-A through 70-N are provided with information regarding hosting and porting with the main container 62.

The main container 62 includes an agent management service (AMS) 63, a directory facilitator (DF) 64 and an introspector 68. The main container 62 also includes a centralized meta-data table comprising the address locations of the agents contained in the agent containers (70-A through 70-N). In one embodiment, the agent containers are hosted on one or more nodes, each node being an individual system. In addition, each node comprises a localized meta-data table containing details pertaining to the agents hosted on the node. Further, a custom kernel service is configured on each node to monitor the life-cycle of the agents included in the agent container hosted on the node.

The AMS 63 is configured to process one or more requests received from the agency builder 44. The AMS 63 is a central controller of the main container 62 and is responsible for overseeing an entire life cycle of the agents. The AMS 63 includes the entire details of the main container 62 that comprises encompassing agent's creation and deletion, locations and services provided.

The directory facilitator 64 is a service provider entity in the main container 62. The DF 64 offers the details of all the services provided by the agent, exposed as information for other agents to know and make use of.

The introspector 68 provides monitoring service within the event processing system 10 to subscribe to the AMS 63 and receive updates at both the agent as well as the agent container (70-A through 70-N) levels. Further the introspector 68 investigates and records all events on the platform 61, both at agent and agent container level. Lastly, the introspector 68 latches onto any remote container created on the platform 61. In its course of functionality, the introspector 68 captures the information from within the platform like agent created, agent killed, agent state (current and change of state), agent behavior (current and change of state), agent computation time, messages received, messages sent, messages posted, container added, container removed.

In one embodiment, the events recorded within the platform 61 by the introspector 68 are pushed using the socket server 74 to a monitoring application 72 which collates all the information in a structured JSON format and pushes to the web socket for consumption by the monitoring interface 76. Further, the information received from the introspector 68 is passed to the storage module 28 via a data access object framework 78. The data access object framework 78 is responsible for CRUD operations related to data management in JAVA.

The above described event processing system 10 implements several user interfaces to enable one or more users to create the agents, agencies and ecosystems. Some of the relevant interfaces are described in further detail below.

Figure 6:
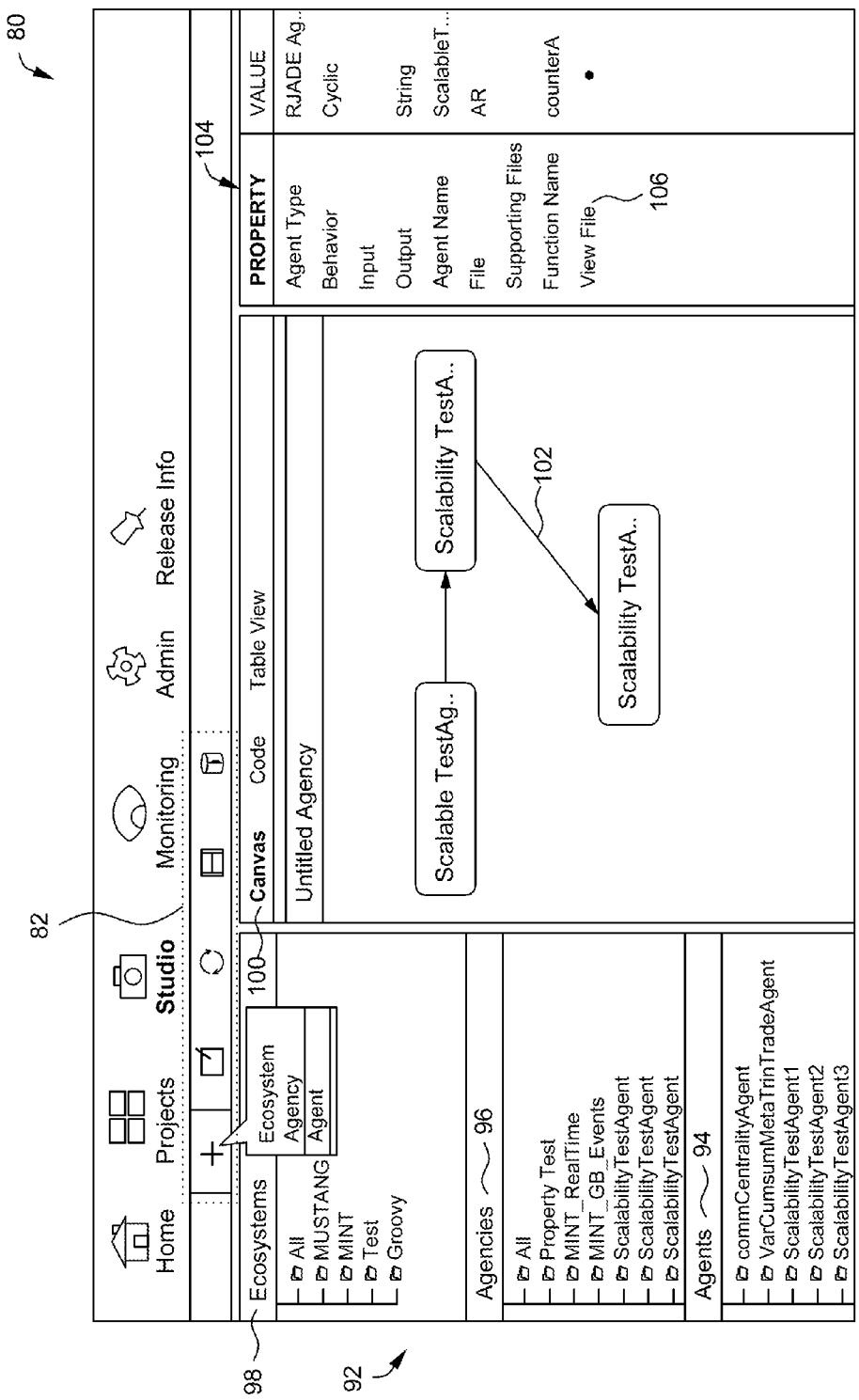
FIG. 6 is graphical representation of an example studio interface for enabling one or more users to create agents, agencies and ecosystems implemented according to aspects of the present technique.

FIG. 6 is graphical representation of an example studio for enabling one or more users to create agents, agencies and ecosystems implemented according to aspects of the present technique.

The studio interface 80 includes several tabs (shown by reference numeral 82) like 'ADD', 'DELETE', 'REFRESH', 'EDIT', 'CLONE', 'PUBLISH', 'KILL', 'SWITCH' etc. The 'ADD' tab provides the user an option to create an agent, agency and/or ecosystem. The 'EDIT' tab allows the user to edit the configuration of an existing agent and/or agency. The 'CLONE' tab allows the user to create clones of an existing agent and/or agency. The 'DELETE' tab allows the user to delete the meta-data information of an agent, agency and/or ecosystem. The 'PUBLISH' tab allows the user to activate a lifecycle of an agent and/or agency in the multi-agent based system 12. In addition, the 'KILL' tab allows the user to actually terminate the functioning lifecycle of an agent and/or agency in the multi-agent based system 12. The 'SWITCH' tabs functionality is two-fold—it allows the meta-data information about an agent and/or agencies to be moved across databases. It also allows for the agencies and/or agents themselves to be moved across environments. In one embodiment, the tabs are relevant based on the selection of either ecosystem, agency, or agent. For example, on selection of ecosystem, the only tabs that can be used are 'ADD', 'DELETE' and 'REFRESH' while the remaining ones are greyed out.

The studio interface 80 includes a panel 92 that illustrates the agents 94, agencies 96 and ecosystems 98 existing in an example multi-agent based system 12. On invoking the action of 'ADD' tab the interface transitions to the user interface for creating agents. The studio interface 80 further includes a canvas 100 that allows the user to drag and drop agents available in the multi-agent based system 12 and wire them together (as shown by reference numeral 102) based on their input type and output type compatibility. The properties associated with each agent are shown in pane 104 of the studio interface 80 for a quick lookup. The 'view file' tab 106 displays the deployed analytical script file for the user. The pane 92 is populated upon selection of an agent on the canvas by tapping it.

Figure 7:
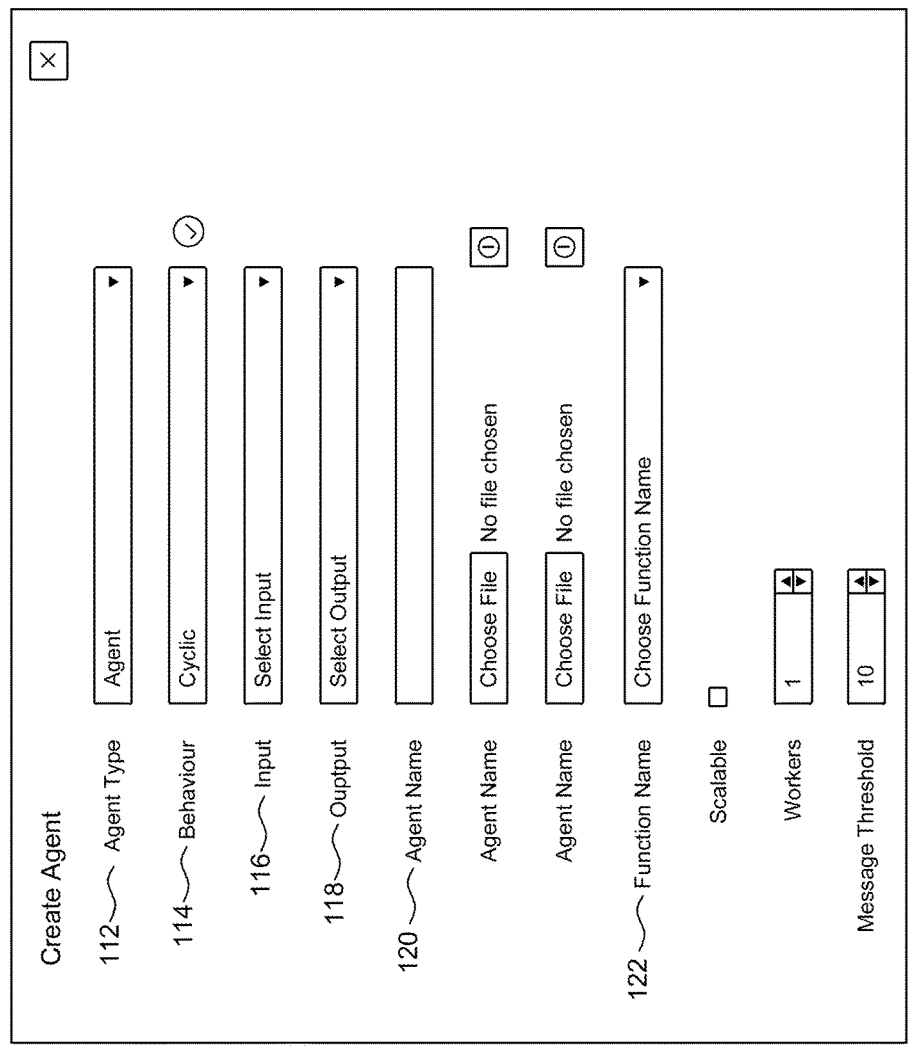
FIG. 7 is graphical representation of an example user interface for creating an agent implemented according to aspects of the present technique.

FIG. 7 is graphical representation of an example user interface for creating an agent implemented according to aspects of the present technique. The user interface 110 enables the user to configure several parameters like agent type (cell 112), behaviour (cell 114), input (cell 116), output (cell 118), pertaining to the creation of the agent. Further, the user can provide a name (cell 120) and select the function (cell 122) for the particular agent to be created.

FIG. 8 is graphical representation of an example user interface depicting ecosystems, agencies and agents of an event processing system implemented according to aspects of the present technique. The 'Ecosystems' pane (cell 132) provides a table view of all the agents (cell 134) and their associated parent agency (cell 136) in the event processing system, host location of an agent (cell 138), number of messages in its inbox (cell 140), computing time of the agent (cell 142), number of messages received by an agent (cell 144), number of messages sent (cell 146), name of the message sending agent (cell 148) and associated time stamp of each message received (cell 150).

Figure 9:
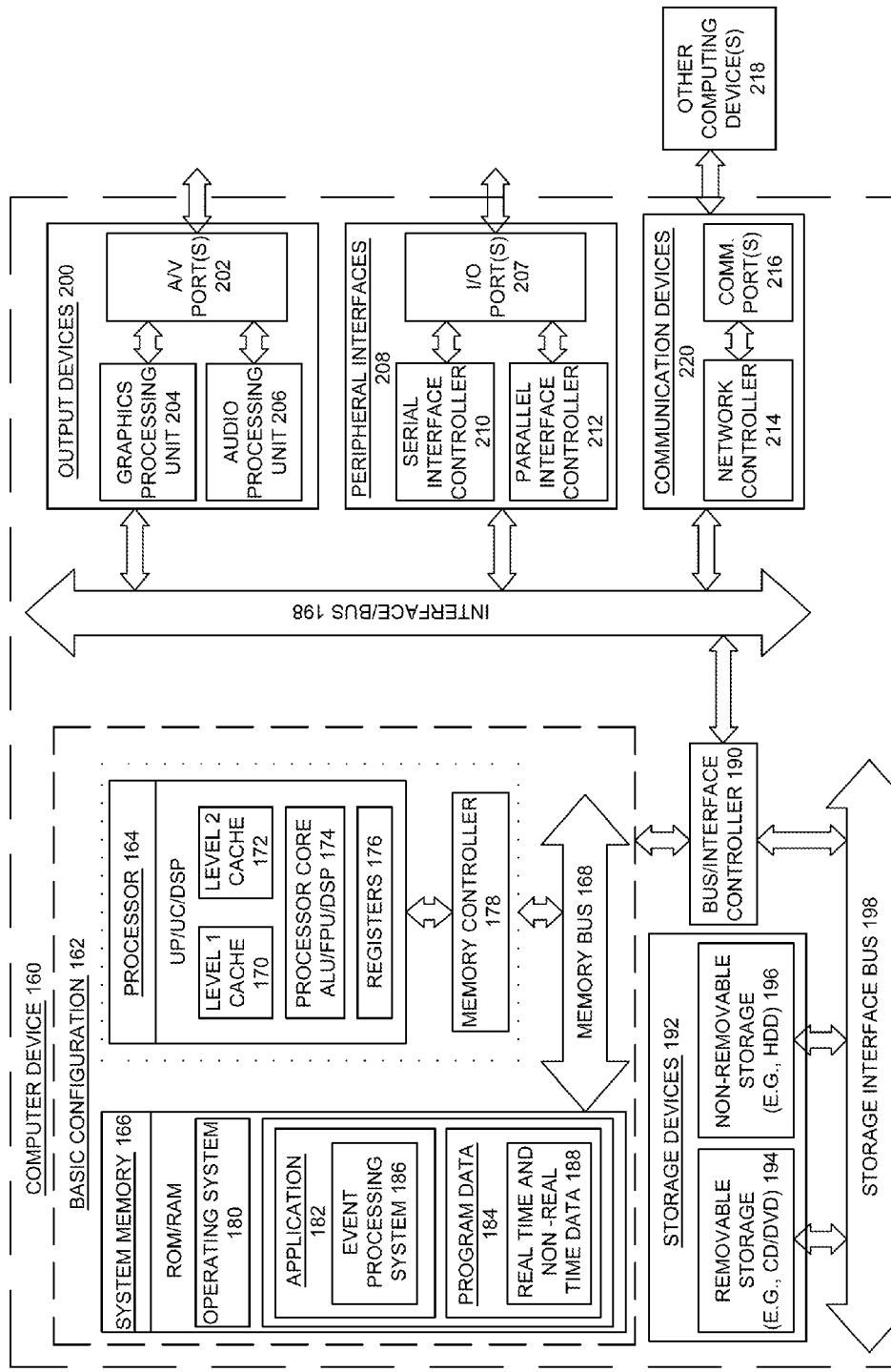
FIG. 9 is a block diagram of an example general-purpose computing device used to implement an event processing system implemented according to aspects of the present technique.

FIG. 9 is a block diagram of an example general-purpose computing device used to implement an event processing system implemented according to aspects of the present technique. In a very basic configuration 162, computing system 160 typically includes one or more processors 164 and a system memory 166. A memory bus 168 may be used for communicating between processor 164 and system memory 166.

Depending on the desired configuration, processor 164 may be of any type including but not limited to a microprocessor (μP), a microcontroller (μC), a digital signal processor (DSP), or any combination thereof. Processor 164 may include one or more levels of caching, such as a level one cache 170 and a level two cache 172, a processor core 174, and registers 176. An example processor core 174 may include an arithmetic logic unit (ALU), a floating point unit (FPU), a digital signal processing core (DSP Core), or any combination thereof. An example memory controller 178 may also be used with processor 164, or in some implementations memory controller 178 may be an internal part of processor 164.

Depending on the desired configuration, system memory 166 may be of any type including but not limited to volatile memory (such as RAM), non-volatile memory (such as ROM, flash memory, etc.) or any combination thereof. System memory 166 may include an operating system 180, an application 182 comprising an event processing system 186 and a program data 184 comprising real time and non-real time data 188.

An event processing system 186 is configured to process real time data and non-real time data 188 while executing programmable tasks stored in the program data 184. This described basic configuration 162 is illustrated in FIG. 9 by those components within the inner dashed line.

Computing system 160 may have additional features or functionality, and additional interfaces to facilitate communications between basic configuration 162 and any required devices and interfaces. For example, a bus/interface controller 190 may be used to facilitate communications between basic configuration 162 and one or more data storage devices 192 via a storage interface bus 198. Data storage devices 192 may be removable storage devices 194, non-removable storage devices 196, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 166, removable storage devices 194 and non-removable storage devices 196 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing system 160. Any such computer storage media may be part of computing system 160.

Computing system 160 may also include an interface bus 198 for facilitating communication from various interface devices (e.g., output devices 200, peripheral interfaces 208, and communication devices 220) to basic configuration 162 via bus/interface controller 190. Example output devices 200 include a graphics processing unit 204 and an audio processing unit 206, which may be configured to communicate to various external devices such as a display or speakers via one or more A/V ports 202.

Example peripheral interfaces 208 include a serial interface controller 210 or a parallel interface controller 212, which may be configured to communicate with external devices such as input devices (e.g., keyboard, mouse, pen, voice input device, touch input device, etc.) or other peripheral devices (e.g., printer, scanner, etc.) via one or more I/O ports 207. An example communication device 220 includes a network controller 214, which may be arranged to facilitate communications with one or more other business computing devices 218 over a network communication link via one or more communication ports 216.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing system 160 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. It may be noted that computing system 160 may also be implemented as a personal computer including both laptop computer and non-laptop computer configurations.

The above described event processing system provides several advantages including processing real time data in a faster and more efficient technique by allowing for easy deployment of analytical tasks in the form of process flows. The event processing system is provisioned to support statistical, data engineering and scoring models alike, aided by a distributed and loosely coupled architecture for ease of customization and usage.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated and described herein, many modifications and changes will occur to those skilled in the art. It is, therefore, to be understood that the appended claims are intended to cover all such modifications and changes as fall within the true spirit of the invention.

What is claimed is:

1. An event processing system, the system comprising:
   a controller, including
   an interface, and
   a first processor upon executing computer-readable instructions to display the interface for usage by one or more users, performing
   receiving, via the interface, a request to create a plurality of agents for performing a first set of programmable tasks with reference to real time data, defining at least one parameter of each of the plurality of agents and defining compatibility relationships among the plurality of agents, grouping a plurality of the agents together, based upon at least one of the at least one defined parameter and the at least one common compatibility relationship, to create at least a first agency and a second agency, storing, via the interface, the first agency and the second agency, and moving the first agency from the storage to separate physical processors, wherein the first agency performs the first set of programmable tasks with the reference to the real time data, to produce a first result;

wherein, by a batch processing system including a third processor, the second set of programmable tasks are deployed;

wherein the second agency is moved from the storage to another separate physical processors; and wherein the second agency performs the second set of programmable tasks with respect to non-real time data corresponding to the first result of the real time data;

monitoring data corresponding to a lifecycle of the first agency and the second agency, communication-amongst the first agency and the second-agency and a processing time of the first set of programmable tasks and the second-set of programmable tasks being performed by the respective first and second agency, managing a multi-agent based system and the batch processing system, and terminating, based upon the monitored data of the first set of programmable tasks and the second set of programmable tasks by the respective first and second agency, the first agency and the second agency.

2. The system of claim 1, wherein the first processor of the controller is configured to be hosted on a plurality of platforms.

3. The system of claim 1, further comprising: a monitoring interface coupled to the multi-agent based system, a second processor, upon executing the computer-readable instructions to display the monitoring interface for usage by the one or more users, being configured to enable the one or more users to track one or more activities performed by the multi-agent based system.

4. The system of claim 3, wherein the second processor, upon executing the computer-readable instructions to display the monitoring interface for usage by the one or more users, is further configured to enable tracking of a plurality of messages communicated by the first agency and the second agency via the monitoring interface.

5. The system of claim 1, wherein the first processor of the controller is configured, upon executing the computer-readable instructions to display the interface for usage by one or more users, to enable the one or more users to select and group, via one or more of a plurality of tabs on the interface, a set of the plurality of agents to group a plurality of the agents into the first agency and the second agency, and the set of the first agency and the second agency being selectable based on at least one common defined parameter and/or at least one common compatibility relationship determined by the one or more users.

6. The system of claim 5, wherein the first processor of the controller is further configured, upon executing the computer-readable instructions to display the interface for usage by one or more users, to enable the one or more users to select and group, via one or more of the plurality of tabs, a set of related agencies to form an ecosystem, and wherein the set of related agencies is selectable based on a set of criteria determined by the one or more users.

7. The system of claim 1, further comprising:
a communication module configured to facilitate communication between the separate physical processors, the multi-agent based system and the batch processing system.

8. The event processing system of claim 1, wherein the first processor of the controller, upon executing computer-readable instructions to display the interface for usage by the one or more users, is configured to, activate a lifecycle of each of the one or more of the first agency and the second agency in the multi-agent based system upon receiving a corresponding publish command, and terminate the lifecycle of each of the one or more of the first agency and the second agency in the multi-agent based system upon receiving a corresponding kill command.

9. A real time multi-agent based system comprising:
a memory including a set of computer-readable instructions stored therein;

at least one processor, upon executing the set of computer-readable instructions, performing, receiving a plurality of agents from a controller, via selections received from an interface of the controller, the plurality of agents being defined by the controller for performing a first set of programmable tasks with reference to real time data, the controller, upon the set of executing computer-readable instructions to display the interface for usage by one or more users, performing, via selections received from an interface, defining at least one parameter of each of the plurality of agents and define compatibility relationships among the plurality of agents grouping a plurality of the agents together, based upon at least one of the at least one common defined parameter and the at least one common compatibility relationships among the plurality of agents, to create at least a first agency and a second agency, storing the first agency and the second agency, and moving the first agency from the storage to separate physical processors, wherein the first agency performs the first set of programmable tasks with the reference to the real time data, to produce a first result;

wherein, by a batch processing system including a third processor, the second set of programmable tasks are deployed;

wherein the second agency is moved from the storage to another separate physical processors; and wherein the second agency performs the second set of programmable tasks with respect to non-real time data corresponding to the first result of the real time data;

monitoring data corresponding to a lifecycle of the first agency and the second agency, communication amongst the first agency and the second agency and a processing time of the first set of programmable tasks and the second set of programmable tasks being performed by the respective first and second agency, communicating the monitored data to the controller for the controller to manage the multi-agent based system, and terminating, based upon the monitored data of the first set of programmable tasks and the second set of programmable tasks by the respective first and second agency, the first agency and the second agency.

10. The real time multi-agent based system of claim 9, further comprising: a monitoring interface, upon executing the set of computer-readable instructions to display the interface for usage by the one or more users, coupled to the real time multi-agent based system and configured to enable the one or more users to track one or more activities performed by the multi-agent based system.

11. The real time multi agent based system of claim 9, wherein the at least one processor is further configured to execute the computer-readable instructions to one of activate and terminate a lifecycle of one or more of the first agency and the second agency upon receiving a corresponding command from the controller.

12. A method for processing an event, the method comprising:
   defining, using one or more of a plurality of tabs displayed on a display of an interface, a plurality of agents for performing a first set of programmable tasks with reference to real time data; defining at least one parameter of each of the plurality of agents and
   defining compatibility relationships among the plurality of agents, using one or more of the plurality of tabs on the display;
   grouping a plurality of the agents together, based upon at least one of the at least one defined parameter and the at least one common compatibility relationship, to create at least a first agency and a second agency, using one or more of the plurality of tabs on the display, the at least first agency and the second agency being storable together and the at least first agency and the second agency being movable between and executable by separate physical processors;
   defining a second set of programmable tasks to be performed with respect to non-real time data corresponding to the real time data;
   deploying the at least first agency and the second agency and the second set of programmable tasks to the separate physical processors;
   monitoring data corresponding to a lifecycle of the at least first agency and the second agency, communication amongst the at least first agency and the second agency and a processing time of the first set of programmable tasks and the second set of programmable tasks being performed by the respective first and second agency;
   executing the first set of programmable tasks;
   receiving instructions from the one of more users to manage the real time data and the non-real time data; and
   terminating, based upon the monitored data of the first set of programmable tasks and the second set of programmable tasks by the respective first and second agency, the first agency and the second agency.

13. The method of claim 12, further comprising: tracking a progress of the first agency and the second agency and a plurality of messages communicated by the first agency and the second agency.

14. The method of claim 12, further comprising: one of activating and terminating a lifecycle of one or more of the first agency and the second agency upon receiving a corresponding command via one or more of the plurality of tabs.

* * * * *